(12) United States Patent
Burian

(10) Patent No.: US 11,950,564 B1
(45) Date of Patent: Apr. 9, 2024

(54) KITTY WATER LOO AND ASSOCIATED METHOD(S)

(71) Applicant: Richard Burian, Gardena, CA (US)

(72) Inventor: Richard Burian, Gardena, CA (US)

(*) Notice: Subject to any disclaimer, the term of this patent is extended or adjusted under 35 U.S.C. 154(b) by 0 days.

(21) Appl. No.: 18/482,225

(22) Filed: Oct. 6, 2023

Related U.S. Application Data

(63) Continuation-in-part of application No. 18/177,838, filed on Mar. 3, 2023, now Pat. No. 11,778,978.

(51) Int. Cl.
*A01K 1/01* (2006.01)

(52) U.S. Cl.
CPC .................................. *A01K 1/0107* (2013.01)

(58) Field of Classification Search
CPC .... A01K 1/0107; A01K 1/011; A01K 1/0114; A01K 1/0121; A01K 1/0125; A01K 15/02
See application file for complete search history.

(56) References Cited

U.S. PATENT DOCUMENTS

| | | | | |
|---|---|---|---|---|
| 2,306,014 | A * | 12/1942 | Carson | A01K 1/0107 119/161 |
| 9,232,766 | B1 * | 1/2016 | Strohdach, Sr. | A01K 1/0121 |
| 11,297,795 | B2 * | 4/2022 | LaBounty | A01K 1/0121 |
| 2008/0202439 | A1 * | 8/2008 | Lapidge | A01K 1/0121 119/162 |
| 2009/0211530 | A1 * | 8/2009 | Yu | A01K 1/0121 119/162 |
| 2020/0178492 | A1 * | 6/2020 | Rescate | A01K 1/0121 |

* cited by examiner

*Primary Examiner* — Ebony E Evans
(74) *Attorney, Agent, or Firm* — Ashkan Najafi

(57) ABSTRACT

A kitty water loo includes a main housing, a basin removably seated within the main housing and being configured to contain water therein, a lid positioned onto the main housing above the basin, and a plurality of litter trays arranged in a concentrically stacked configuration and supported by the lid above the basin. The litter trays are configured to contain cat litter therein and further configured to be chronologically removed one-by-one such that the water is progressively exposed in the basin therebelow. The concentrically stacked configuration extends downwardly and inwardly towards the basin.

18 Claims, 7 Drawing Sheets

KITTY WATER LOO AND ASSOCIATED METHOD(S)

CROSS REFERENCE TO RELATED APPLICATIONS

This is a continuation-in-part patent application of currently U.S. non-provisional patent application Ser. No. 18/177,838, filed on Mar. 3, 2023, now U.S. Pat. No. 11,778,978 having an issue date of Oct. 10, 2023, which is incorporated by reference in its entirety.

STATEMENT REGARDING FEDERALLY SPONSORED RESEARCH OR DEVELOPMENT

Not Applicable.

REFERENCE TO A MICROFICHE APPENDIX

Not Applicable.

BACKGROUND

Technical Field

Exemplary embodiment(s) of the present disclosure relate to feline potty-training device and, more particularly, to a kitty water loo including a plurality of selectively removable litter trays that progressively and chronologically provide greater access to a water reservoir for teaching a cat to go potty in the water reservoir rather than a litter box.

Prior Art

Many pets, especially cats, can be trained to use a litterbox. However, litter boxes must be cleaned, and the litter periodically changed. Litter can be accidentally moved out of the litter box by a cat and litter boxes can emit unappealing smells. This leads to a number of disadvantages, including odor, and the need to regularly remove feces. It is for these reasons that many cat owners prefer options other than litter boxes. The most obvious choice, other than a litterbox, is to train a cat to go to the bathroom exterior. However, for many people, such a choice is not possible. Many people do not have the time in their schedules to walk their cats at necessary times. Furthermore, many cats cannot be trained to safely roam free outdoors.

Moreover, an upset cat will not use the litter box. Because cats are naturally fastidious, it is hard to keep that area consistently clean and fresh. Cats are meticulously clean and cannot tolerate the smell or feel of a dirty box. If a cat cannot find a clean place to dig, the cat is out of there.

Furthermore, the average cost for litter annually is $300 or more. The money spent on litter accessories for cleanup and odor control can add-up. Household cleaning and food safety problems are caused by scattering litter and litter dust caught between the paws and body fur as well as urine and feces particles throughout the home as well as cooking, eating, and sleeping areas cannot be prevented by litter catcher mats.

Electro-mechanical litter systems do not work during a power outage and have to be plugged into an available outlet. Unlike the present disclosure they have a limited life spam, they can break down and jam up plus when it comes time to cleaning one it usually is not easy. Some of these devices have to use expensive cartridges and chemicals instead of water.

Accordingly, a need remains for a kitty water loo in order to overcome at least one aforementioned shortcoming. The exemplary embodiment(s) satisfy such a need by providing a kitty water loo including a plurality of selectively removable litter trays that is convenient and easy to use, lightweight yet durable in design, versatile in its applications, and configured for progressively and chronologically providing greater access to a water reservoir for teaching a cat to go potty in the water reservoir rather than a litter box.

BRIEF SUMMARY OF NON-LIMITING EXEMPLARY EMBODIMENT(S) OF THE PRESENT DISCLOSURE

In view of the foregoing background, it is therefore an object of the non-limiting exemplary embodiment(s) to provide a kitty water loo including a plurality of selectively removable litter trays that progressively and chronologically provide greater access to a water reservoir for teaching a cat to go potty in the water reservoir rather than a litter box. These and other objects, features, and advantages of the non-limiting exemplary embodiment(s) are provided by a kitty water loo for self-training a cat to potty in water. The kitty water loo includes a main housing, a basin removably seated within the main housing and being configured to contain water therein, a lid removably positioned onto the main housing above the basin, and a plurality of litter trays adjustably arranged in a concentrically stacked configuration and supported by the lid above the basin. Advantageously, the litter trays are configured to contain cat litter therein and further configured to be chronologically removed one-by-one such that the water is progressively exposed in the basin therebelow. Advantageously, the concentrically stacked configuration extends downwardly and inwardly towards the basin.

In a non-limiting exemplary embodiment, the basin includes at least one of: a drawer being removably inserted into the main housing and being configured to hold water therein, and a reservoir being removably disposed within the drawer and being configured to hold water therein.

In a non-limiting exemplary embodiment, the main housing is free-standing and portable. The main housing includes a central cavity configured to entirely contain the drawer and the reservoir therein, and an outer wall including an aperture configured to slidably receive the drawer along a horizontal bi-directional travel path relative to a central longitudinal axis of the main housing.

In a non-limiting exemplary embodiment, the main housing has an open top end configured to vertically receive the reservoir seated within the drawer. Such a drawer has a first friction member slidably and frictionally engaged with a second friction member of the main housing.

In a non-limiting exemplary embodiment, the lid has a circular shape provided with a central aperture vertically aligned along a central longitudinal axis of the main housing. Notably, an outer peripheral edge of the lid is supported about the open top end of the main housing.

In a non-limiting exemplary embodiment, the litter trays includes a first litter tray being concentrically seated directly on the lid and having a first central opening vertically aligned above the reservoir.

In a non-limiting exemplary embodiment, the litter trays further includes a second litter tray being concentrically seated directly on the first litter tray and having a second central opening vertically aligned above the reservoir.

In a non-limiting exemplary embodiment, the litter trays further includes a third litter tray being concentrically seated directly on the second litter tray and having a third central opening vertically aligned above the reservoir.

In a non-limiting exemplary embodiment, the litter trays further includes a fourth litter tray being concentrically seated directly on the third litter tray and having a fourth central opening vertically aligned above the reservoir.

In a non-limiting exemplary embodiment, the litter trays further includes a fifth litter tray being concentrically seated directly the fourth litter tray and having a solid bottom surface vertically aligned above the reservoir.

There has thus been outlined, rather broadly, the more important features of non-limiting exemplary embodiment(s) of the present disclosure so that the following detailed description may be better understood, and that the present contribution to the relevant art(s) may be better appreciated. There are additional features of the non-limiting exemplary embodiment(s) of the present disclosure that will be described hereinafter and which will form the subject matter of the claims appended hereto.

BRIEF DESCRIPTION OF THE NON-LIMITING EXEMPLARY DRAWINGS

The novel features believed to be characteristic of non-limiting exemplary embodiment(s) of the present disclosure are set forth with particularity in the appended claims. The non-limiting exemplary embodiment(s) of the present disclosure itself, however, both as to its organization and method of operation, together with further objects and advantages thereof, may best be understood by reference to the following description taken in connection with the accompanying drawings in which:

Figure 1:
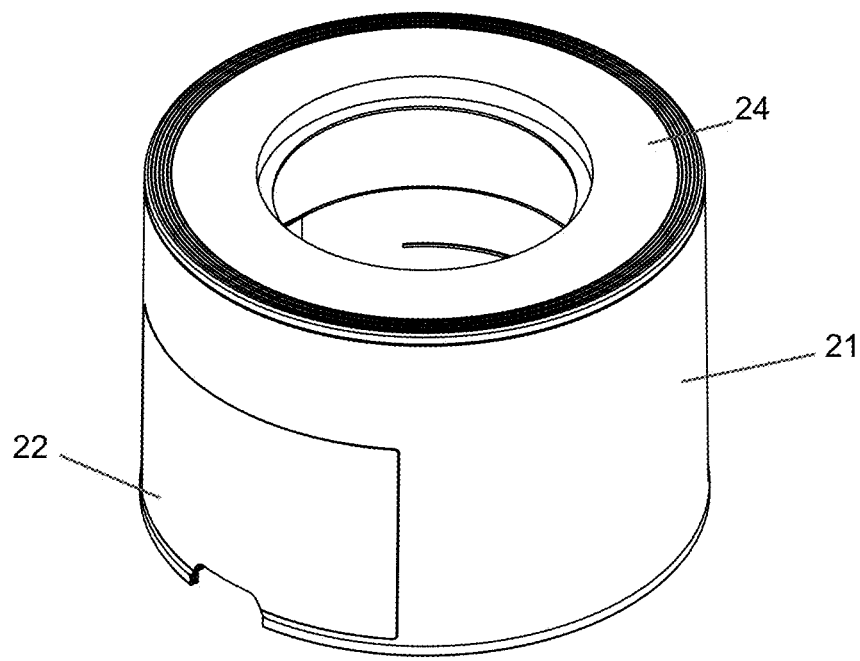
FIG. 1 is a perspective view of a kitty water loo without the concentric litter trays positioned on the lid, in accordance with a non-limiting exemplary embodiment of the present disclosure.

Those skilled in the art will appreciate that the figures are not intended to be drawn to any particular scale; nor are the figures intended to illustrate every non-limiting exemplary embodiment(s) of the present disclosure. The present disclosure is not limited to any particular non-limiting exemplary embodiment(s) depicted in the figures nor the shapes, relative sizes or proportions shown in the figures.

DETAILED DESCRIPTION OF NON-LIMITING EXEMPLARY EMBODIMENT(S) OF THE PRESENT DISCLOSURE

The present disclosure will now be described more fully hereinafter with reference to the accompanying drawings, in which non-limiting exemplary embodiment(s) of the present disclosure is shown. The present disclosure may, however, be embodied in many different forms and should not be construed as limited to the non-limiting exemplary embodiment(s) set forth herein. Rather, such non-limiting exemplary embodiment(s) are provided so that this application will be thorough and complete, and will fully convey the true spirit and scope of the present disclosure to those skilled in the relevant art(s). Like numbers refer to like elements throughout the figures.

The illustrations of the non-limiting exemplary embodiment(s) described herein are intended to provide a general understanding of the structure of the present disclosure. The illustrations are not intended to serve as a complete description of all of the elements and features of the structures, systems and/or methods described herein. Other non-limiting exemplary embodiment(s) may be apparent to those of ordinary skill in the relevant art(s) upon reviewing the disclosure. Other non-limiting exemplary embodiment(s) may be utilized and derived from the disclosure such that structural, logical substitutions and changes may be made without departing from the true spirit and scope of the present disclosure. Additionally, the illustrations are merely representational are to be regarded as illustrative rather than restrictive.

One or more embodiment(s) of the disclosure may be referred to herein, individually and/or collectively, by the term "non-limiting exemplary embodiment(s)" merely for convenience and without intending to voluntarily limit the true spirit and scope of this application to any particular non-limiting exemplary embodiment(s) or inventive concept. Moreover, although specific embodiment(s) have been illustrated and described herein, it should be appreciated that any subsequent arrangement designed to achieve the same or similar purpose may be substituted for the specific embodiment(s) shown. This disclosure is intended to cover any and all subsequent adaptations or variations of other embodiment(s). Combinations of the above embodiment(s), and other embodiment(s) not specifically described herein, will be apparent to those of skill in the relevant art(s) upon reviewing the description.

References in the specification to "one embodiment(s)", "an embodiment(s)", "a preferred embodiment(s)", "an alternative embodiment(s)" and similar phrases mean that a particular feature, structure, or characteristic described in connection with the embodiment(s) is included in at least an embodiment(s) of the non-limiting exemplary embodiment(s). The appearances of the phrase "non-limiting exemplary embodiment" in various places in the specification are not necessarily all meant to refer to the same embodiment(s).

Directional and/or relationary terms such as, but not limited to, left, right, nadir, apex, top, bottom, vertical, horizontal, back, front and lateral are relative to each other and are dependent on the specific orientation of an applicable element or article, and are used accordingly to aid in the description of the various embodiment(s) and are not necessarily intended to be construed as limiting.

If used herein, "about," "generally," and "approximately" mean nearly and in the context of a numerical value or range set forth means±15% of the numerical.

If used herein, "substantially" means largely if not wholly that which is specified but so close that the difference is insignificant.

Figure 2:
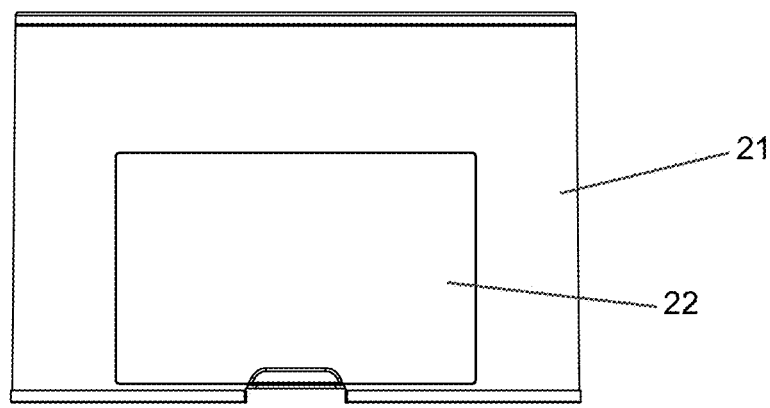
FIG. 2 is a front elevational view of the kitty water loo shown in FIG. 1.
Figure 3:
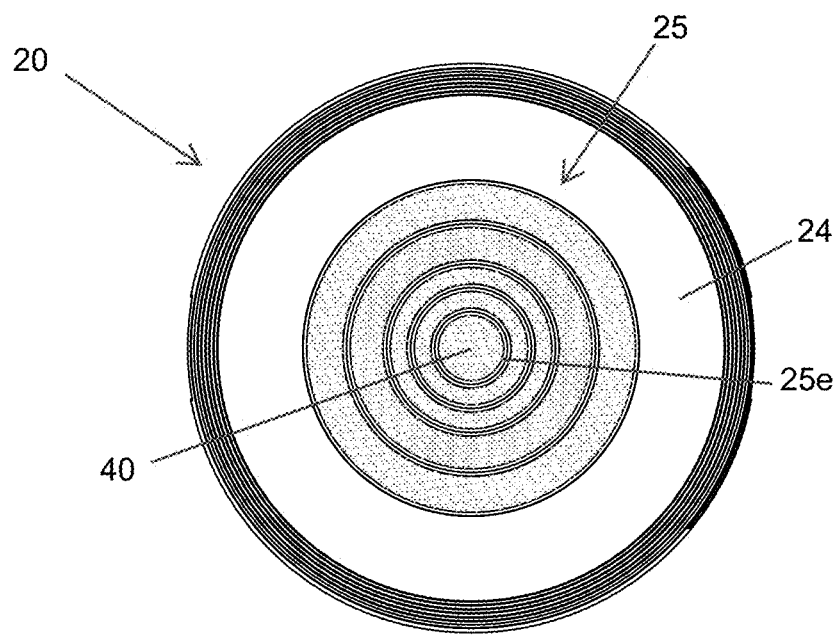
FIG. 3 is a top plan view of the kitty water loo with all concentric litter trays arranged in a concentric stacked configuration.
Figure 4:
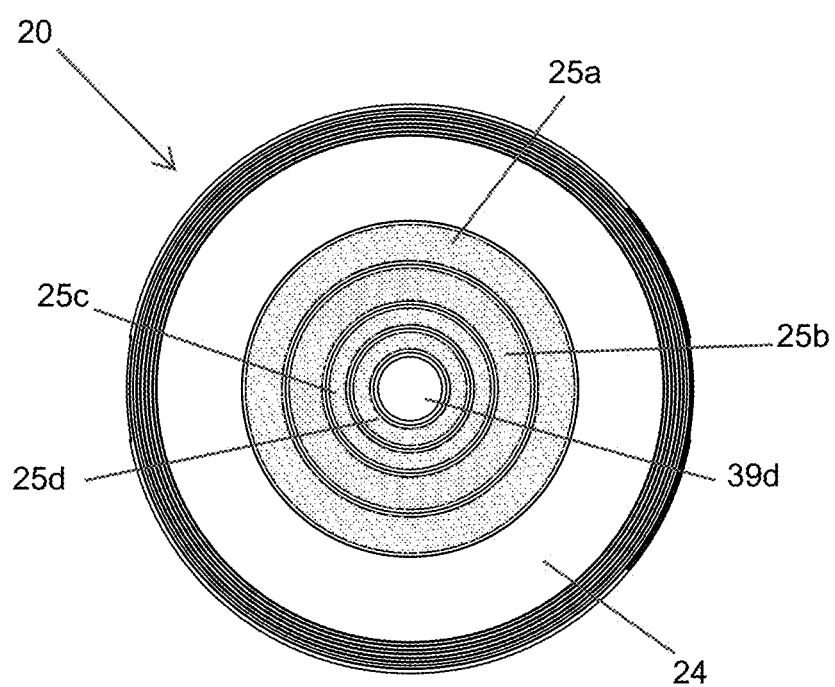
FIG. 4 is a top plan view of the kitty water loo shown in FIG. 3, wherein a central first litter tray is removed thereby exposing water in the basin therebeneath.
Figure 5:
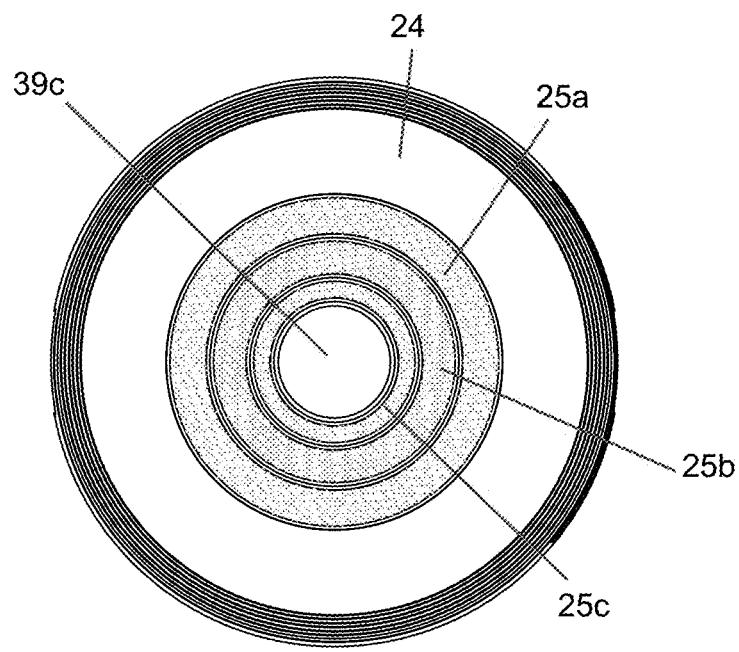
FIG. 5 is a top plan view of the kitty water loo shown in FIG. 4, wherein a second litter tray is removed thereby further exposing water in the basin therebeneath.
Figure 6:
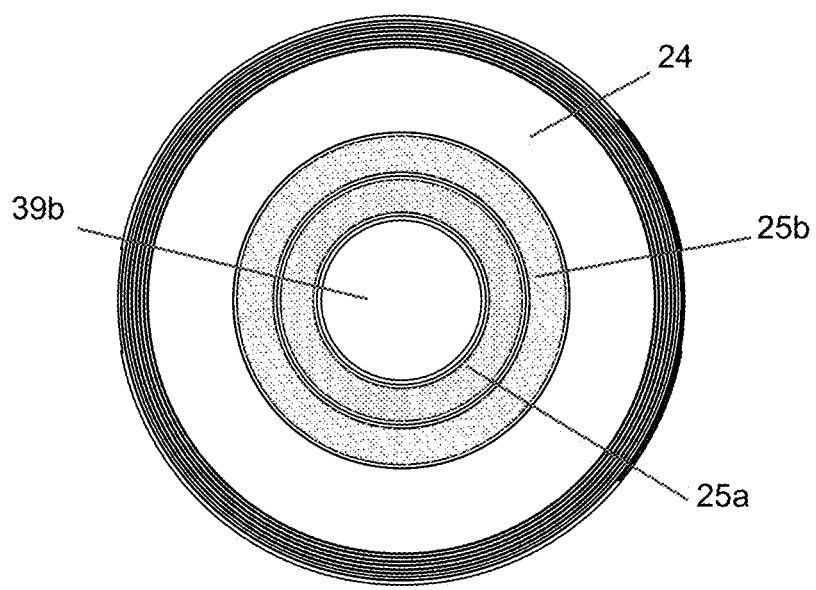
FIG. 6 is a top plan view of the kitty water loo shown in FIG. 5, wherein a third litter tray is removed thereby further exposing water in the basin therebeneath.
Figure 7:
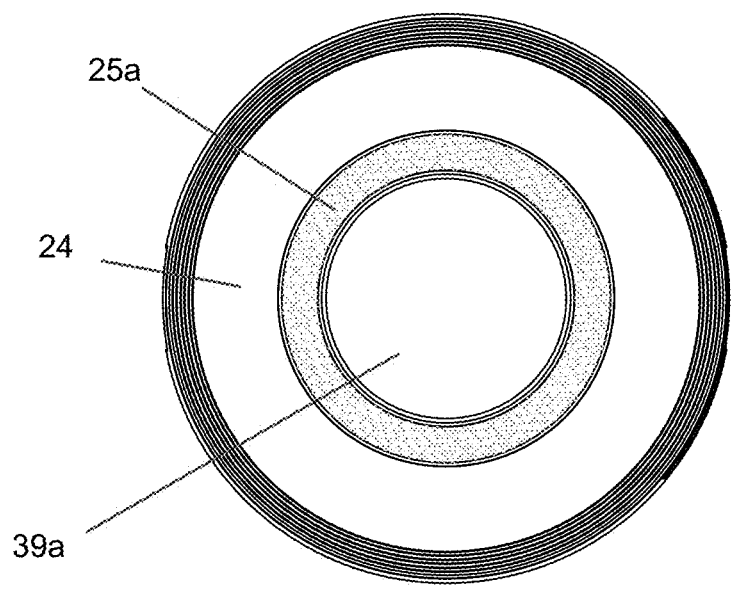
FIG. 7 is a top plan view of the kitty water loo shown in FIG. 6, wherein a fourth litter tray is removed thereby further exposing water in the basin therebeneath.
Figure 8:
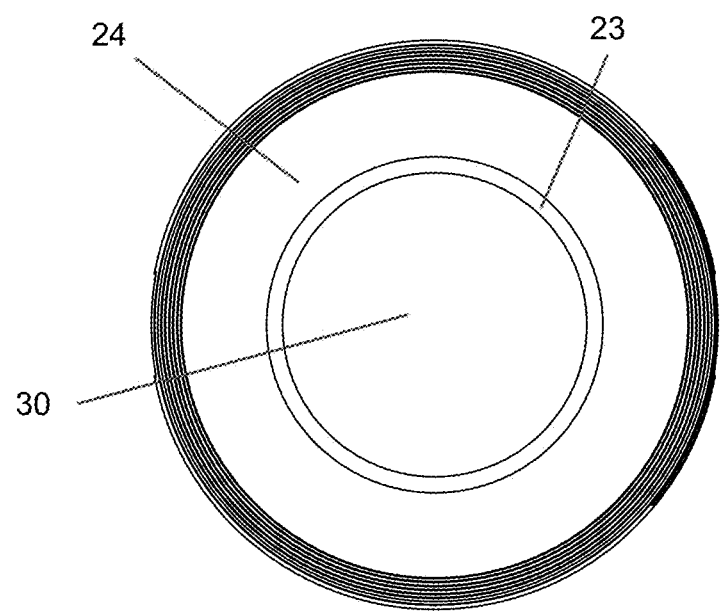
FIG. 8 is a top plan view of the kitty water loo shown in FIG. 7, wherein a fifth litter tray is removed thereby further exposing water in the basin therebeneath.
Figure 9:
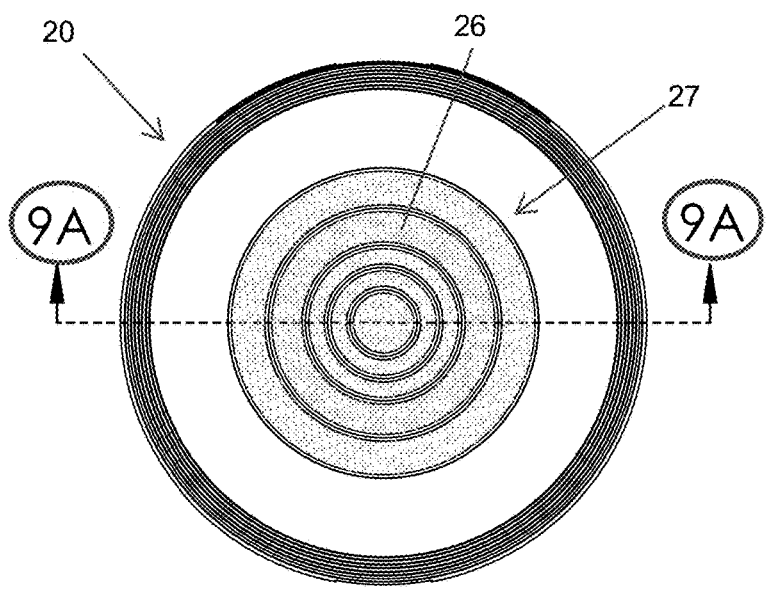
FIG. 9 is another top plan view of the kitty water loo with all concentric litter trays arranged in a concentric stacked configuration.
Figure 9A:
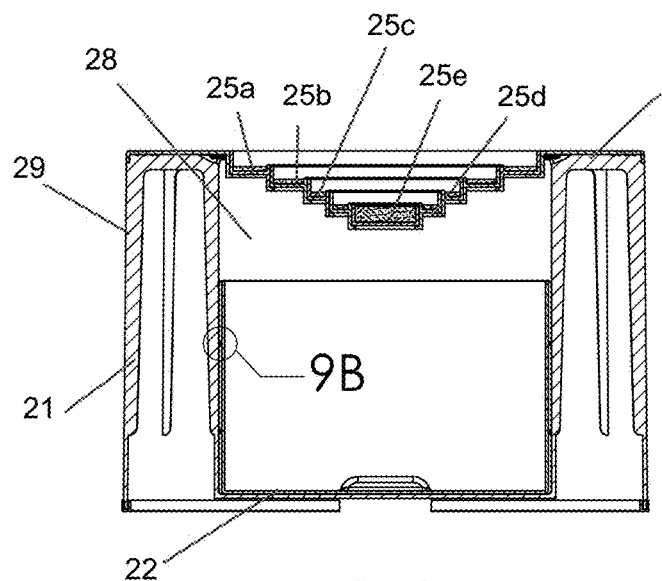
FIG. 9A is a cross-sectional view taken along line 9A-9A in FIG. 9.
Figure 9B:
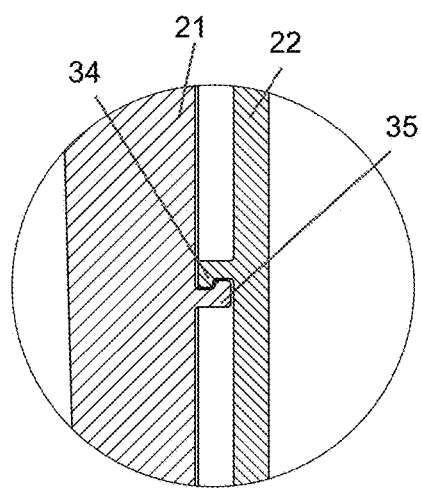
FIG. 9B is an enlarged view of section 9B shown in FIG. 9A.
Figure 10:
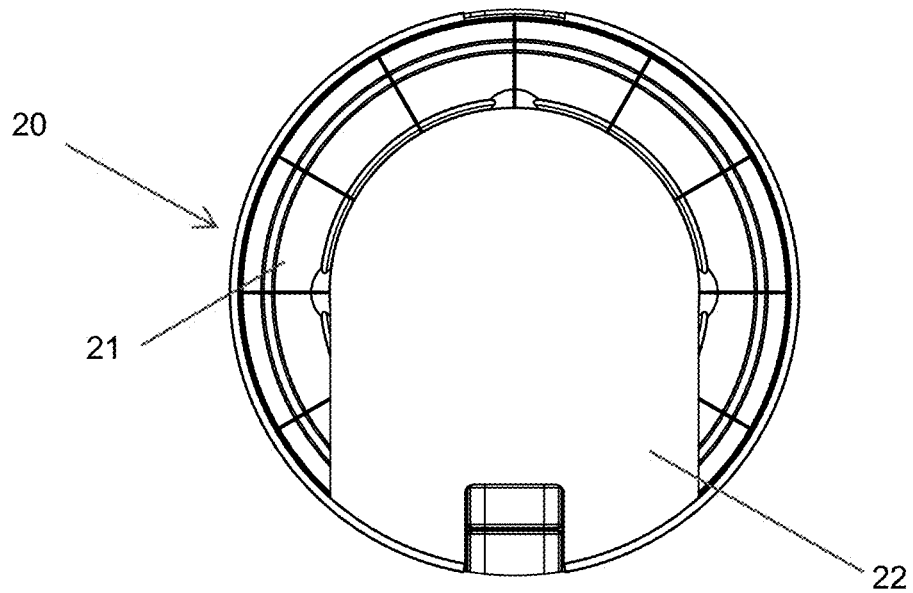
FIG. 10 is a bottom plan view of the kitty water loo shown in FIG. 1.
Figure 11:
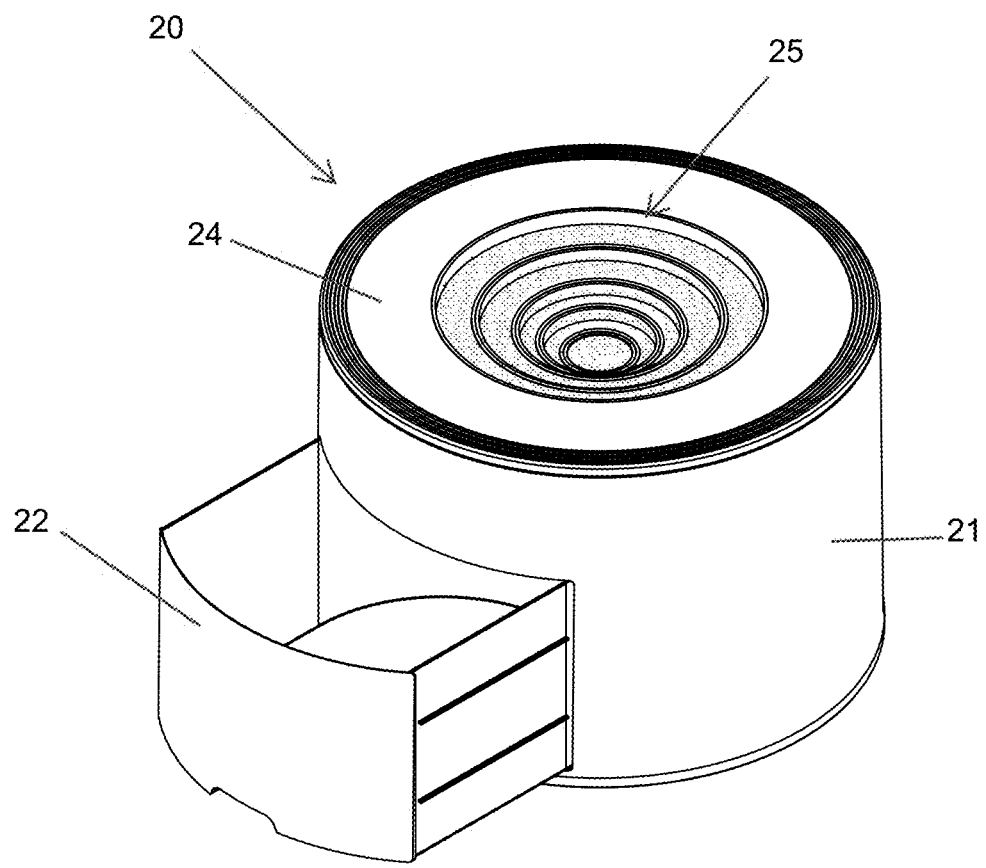
FIG. 11 is a perspective view of the kitty water loo wherein the drawer is extracted outwardly from the main housing.
Figure 12:
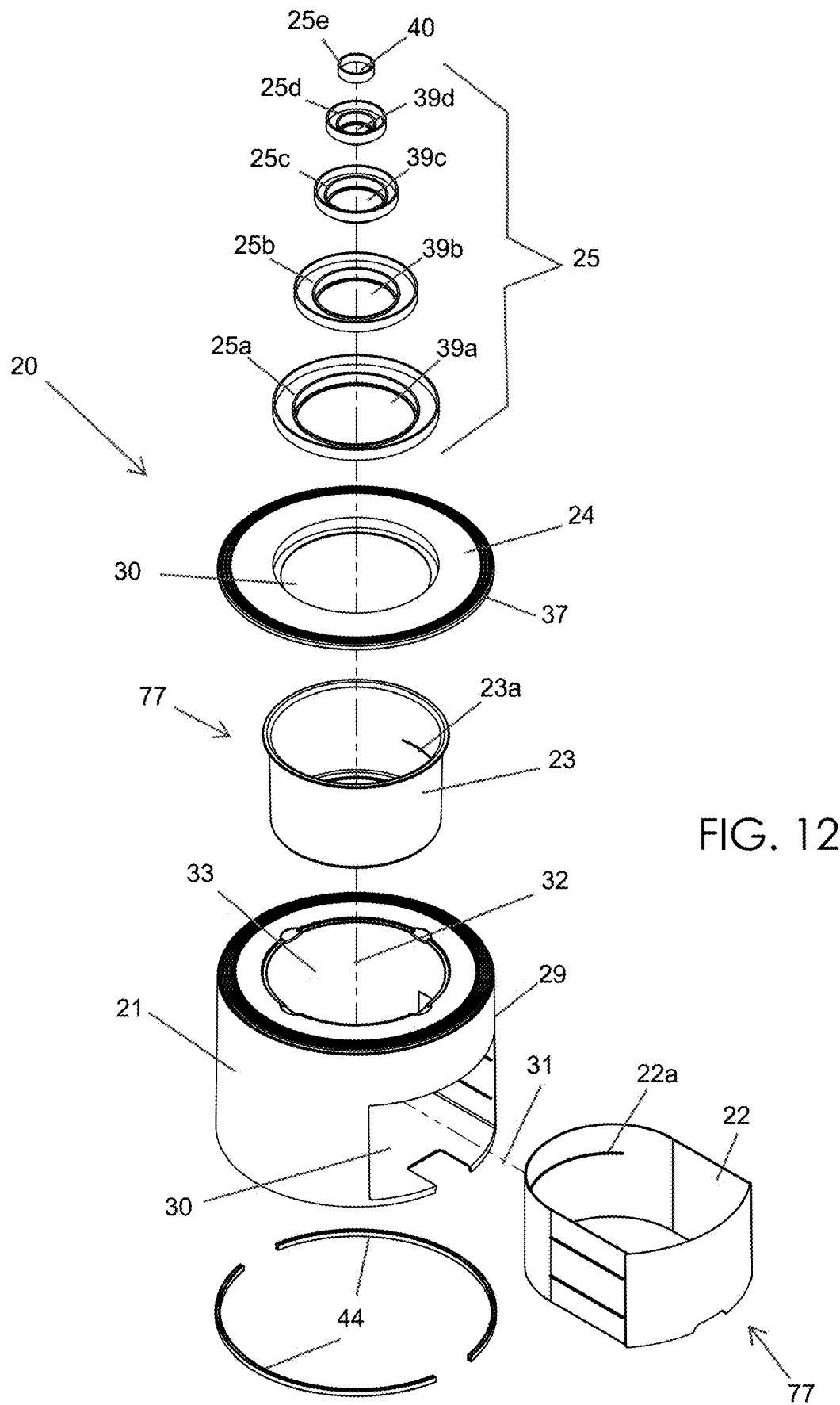
FIG. 12 is an exploded view of the kitty water loo shown in FIG. 9.

The non-limiting exemplary embodiment(s) is/are referred to generally in FIGS. 1-12 and is/are intended to provide a kitty water loo 20 including a plurality of selectively removable litter trays 25 that progressively and chronologically provide greater access to a water basin 77 for teaching a cat to go potty in the water basin 77 rather than a litter 26 box. The kitty water loo 20, for self-training a cat to potty in water, includes a main housing 21, a basin 77 removably seated within the main housing 21 and being configured to contain water therein, a lid 24 removably positioned onto the main housing 21 above the basin 77, and a plurality of litter trays 25 adjustably arranged in a concentrically stacked configuration 27 and supported by the lid 24 above the basin 77. Advantageously, the litter trays 25 are configured to contain cat litter 26 therein and further configured to be chronologically removed one-by-one such that the water is progressively exposed in the basin 77 therebelow. Advantageously, the concentrically stacked configuration 27 extends downwardly and inwardly towards the basin 77. Such a structural configuration yields the new, useful, and unpredicted result of teaching a cat to go potty in water (fluid) rather than in litter 26 (solid granules).

In a non-limiting exemplary embodiment, the basin 77 includes at least one of: a drawer 22 being removably inserted into the main housing 21 and being configured to hold water therein, and a reservoir 23 being removably disposed within the drawer 22 and being configured to hold water therein.

In a non-limiting exemplary embodiment, the main housing 21 is free-standing and portable. The main housing 21 includes a central cavity 28 configured to entirely contain the drawer 22 and the reservoir 23 therein, and an outer wall 29 including an aperture 30 configured to slidably receive the drawer 22 along a horizontal bi-directional travel path 31 relative to a central longitudinal axis 32 of the main housing 21. Such a structural configuration yields the new, useful, and unpredicted result of teaching a cat to go potty in water (fluid) rather than in litter 26 (solid granules).

In a non-limiting exemplary embodiment, the main housing 21 has an open top end 33 configured to vertically receive the reservoir 23 seated within the drawer 22. Such a drawer 22 has a first friction member 34 slidably and frictionally engaged with a second friction member 35 of the main housing 21. Such a structural configuration yields the new, useful, and unpredicted result of teaching a cat to go potty in water (fluid) rather than in litter 26 (solid granules).

In a non-limiting exemplary embodiment, the main housing 21 has rubber grip members 44 affixed to a bottom side thereof to help reduce movement along a support surface.

In a non-limiting exemplary embodiment, the lid 24 has a circular shape provided with a central aperture 30 vertically aligned along a central longitudinal axis 32 of the main housing 21. Notably, an outer peripheral edge 37 of the lid 24 is supported about the open top end 33 of the main housing 21. Such a structural configuration yields the new, useful, and unpredicted result of teaching a cat to go potty in water (fluid) rather than in litter 26 (solid granules).

In a non-limiting exemplary embodiment, the litter trays 25 include a first litter tray 25a being concentrically seated directly on the lid 24 and having a first central opening 39a vertically aligned above the reservoir 23. Such a structural configuration yields the new, useful, and unpredicted result of teaching a cat to go potty in water (fluid) rather than in litter 26 (solid granules).

In a non-limiting exemplary embodiment, the litter trays 25 further include a second litter tray 25b being concentrically seated directly on the first litter tray 25a and having a second central opening 39b vertically aligned above the reservoir 23. Such a structural configuration yields the new, useful, and unpredicted result of teaching a cat to go potty in water (fluid) rather than in litter 26 (solid granules).

In a non-limiting exemplary embodiment, the litter trays 25 further include a third litter tray 25c being concentrically seated directly on the second litter tray 25b and having a third central opening 39c vertically aligned above the reservoir 23. Such a structural configuration yields the new, useful, and unpredicted result of teaching a cat to go potty in water (fluid) rather than in litter 26 (solid granules).

In a non-limiting exemplary embodiment, the litter trays 25 further include a fourth litter tray 25d being concentrically seated directly on the third litter tray 25c and having a fourth central opening 39d vertically aligned above the reservoir 23. Such a structural configuration yields the new, useful, and unpredicted result of teaching a cat to go potty in water (fluid) rather than in litter 26 (solid granules).

In a non-limiting exemplary embodiment, the litter trays 25 further include a fifth litter tray 25e being concentrically seated directly the fourth litter tray 25d and having a solid bottom surface 40 vertically aligned above the reservoir 23. Such a structural configuration yields the new, useful, and unpredicted result of teaching a cat to go potty in water (fluid) rather than in litter 26 (solid granules).

In a non-limiting exemplary embodiment, the training process includes several steps over approximately 3 weeks. Before training begins, insert the reservoir 23 (if you have one cat) and (if you have more than one cat, use the drawer 22). Next, introduce the cat to the kitty water loo 20 by placing the loo 20 near enough to the cat's conventional existing litter box. The cat will have a chance to familiarize itself with the unit by smell and rubbing their scent across it. More likely than not, the cat will jump and begin playing inside the loo 20 as if the loo 20 is a new toy. After a few days, once the cat is comfortable begin training.

In a non-limiting exemplary embodiment, to begin training, remove all the other litter boxes in the house before starting. Given only one choice, the cat will now use the familiarized kitty water loo 20 (KWL). It is important when cleaning the surfaces of the loo 20, never use an ammonia based cleaner to maintain a clean environment. Never use a cat litter scooper as the litter area shrinks making it difficult to use one. Replaceable gloves must be used along with a 2 inch paintbrush and a plastic putty knife.

In a non-limiting exemplary embodiment, the kitty water loo 20 was developed for the cat to train itself without any human intervention to assist or lift the cat in any manner, regardless of the cat's age or disabilities to convert to using water to go potty and to do this in less than three weeks. Occasionally there is a cat that has trouble moving from one step to the next. Not to worry, just repeat the last successful step before advancing. This is extremely rare, but it can happen. It is critical to not assist the cat during training.

In a non-limiting exemplary embodiment, step 1 includes the following: add litter 26 up to the litter indicator line 23*a* in the reservoir 23 (or tray line 22*a*) thus allowing your cat to become familiarized with the KWL as if it was a regular litter box. Continue for 3 days. In step 2, remove all the litter 26 and add water up to the indicator line 23*a*. At this time, add the first litter tray 25*a* to the top of the KWL. In step 3, add ¼ inch flushable litter to ¾ inch regular litter 26. Fill 1.5 inches of this litter mixture into the first litter tray 25*a* about ½ inch from the top thereof. On the next day, start removing ¼ inch of the litter mixture, then add ¼ inch flushable litter every day, while maintaining 1.5 inches of litter 26, for the next three days.

In a non-limiting exemplary embodiment, during step 4, remove the first litter tray 25*a* and discard all the litter 26. Reinsert the first litter tray 25*a* and add 1.5 inches of flushable litter 26, ½ inch to the top of the first litter tray 25*a*. In step 5, remove the smallest fifth internal litter tray 25*e*, thus exposing a 2 inch hole. Continue for 3 days while maintaining litter 26 approximately ½ inch from the top of the first litter tray 25*a*. In step 6, remove the fourth internal litter tray 25*d*, thus exposing a 3.5 inch hole. Continue for 3 days while maintaining litter 26 approximately ½ inch from the top of the primary first litter tray 25*a*.

In a non-limiting exemplary embodiment, in step 7, remove the third internal litter tray 25*c*, thus exposing a 5 inch hole. Continue for 3 days while maintaining litter 26 approximately ½ inch from the top of the primary first litter tray 25*a*. In step 8, remove the second internal litter tray 25*b*, thus exposing a 7.5 inch hole. Continue for 3 days while maintaining litter 26 approximately ½ inch from the top of the primary first litter tray 25*a*.

In a non-limiting exemplary embodiment, in step 9, remove the primary first internal litter tray 25*a*, thus exposing a 9.5 inch hole. In step 10, the user is now ready to remove the lid 24 of the kitty water loo 20, thus exposing a 10.5 inch hole. The user is now ready to use only water for the cat to go to the bathroom.

In a non-limiting exemplary embodiment, the litter trays 25 include several internal litter trays (25*a*-25*d*), each with openings (39*a*-39*d*), plus a small internal litter tray 25*e* with no opening (solid bottom surface 40). The trays (25*a*-25*e*) are locked onto each other and are removable in progressive steps, starting with the smallest litter tray 25*e* without any opening thus exposing a 2 inch hole for the cat to see water below in the reservoir 23 for the first time. As each successive internal litter tray (25*a*-25*d*) is chronologically removed, the openings (39*a*-39*d*) become larger and the cat is exposed to less litter 26 and more water in the reservoir 23. Eventually, as each step progresses and the final internal litter 25*a* tray is removed from the lid 24, the cat will only go to the bathroom in the reservoir 23 containing water without being exposed to litter 26 again.

In a non-limiting exemplary embodiment, the litter trays 25 are modular and attached together thereby creating a group of combined litter trays with a total depth of approximately two inches. It is recommended to use flushable litter instead of regular litter, because flushing regular litter down the toilet will cause a blockage. Cats are used to using regular litter and need to be weaned off of it. This can only be accomplished by gradually replacing the regular litter with flushable litter in small amounts. Eventually, this litter mixture 26 must be discarded and replaced exclusively with flushable litter.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus, the following claims are hereby incorporated into the Detailed Description, with each claim standing on its own as a separately claimed subject matter.

What is claimed as new and what is desired to secure by Letters Patent of the United States is:

1. A kitty water loo for self-training a cat to potty in water, comprising:
   a main housing;
   a basin seated within said main housing and being configured to contain water therein;
   a lid positioned onto said main housing above said basin; and
   a plurality of litter trays arranged in a concentrically stacked configuration and supported by said lid above said basin;
   wherein said litter trays are configured to contain cat litter therein and further configured to be chronologically removed one-by-one such that the water is progressively exposed in said basin therebelow;
   wherein said concentrically stacked configuration extends downwardly and inwardly towards said basin;
   wherein said basin includes at least one of a drawer and a reservoir.

2. The kitty water loo of claim 1, wherein said main housing is free-standing and portable, and comprises:
   a central cavity configured to entirely contain said drawer and said reservoir therein; and
   an outer wall including an aperture configured to slidably receive said drawer along a horizontal bi-directional travel path relative to a central longitudinal axis of said main housing.

3. The kitty water loo of claim 1, wherein said main housing has an open top end configured to vertically receive said reservoir seated within said drawer, said drawer having a first friction member slidably and frictionally engaged with a second friction member of said main housing.

4. The kitty water loo of claim 3, wherein said lid has a circular shape provided with a central aperture vertically aligned along a central longitudinal axis of said main housing; wherein an outer peripheral edge of said lid is supported about said open top end of said main housing.

5. The kitty water loo of claim 1, wherein said litter trays comprise: a first litter tray being concentrically seated directly on said lid and having a first central opening vertically aligned above said reservoir.

6. The kitty water loo of claim 5, wherein said litter trays further comprise: a second litter tray being concentrically seated directly on said first litter tray and having a second central opening vertically aligned above said reservoir.

7. The kitty water loo of claim 6, wherein said litter trays further comprise: a third litter tray being concentrically seated directly on said second litter tray and having a third central opening vertically aligned above said reservoir.

8. The kitty water loo of claim 7, wherein said litter trays further comprise: a fourth litter tray being concentrically seated directly on said third litter tray and having a fourth central opening vertically aligned above said reservoir.

9. The kitty water loo of claim 8, wherein said litter trays further comprise: a fifth litter tray being concentrically seated directly said fourth litter tray and having a solid bottom surface vertically aligned above said reservoir.

10. A kitty water loo for self-training a cat to potty in water, comprising:
    a main housing;
    a basin removably seated within said main housing and being configured to contain water therein;
    a lid removably positioned onto said main housing above said basin; and
    a plurality of litter trays adjustably arranged in a concentrically stacked configuration and supported by said lid above said basin;
    wherein said litter trays are configured to contain cat litter therein and further configured to be chronologically removed one-by-one such that the water is progressively exposed in said basin therebelow;
    wherein said concentrically stacked configuration extends downwardly and inwardly towards said basin;
    wherein said basin includes at least one of a drawer and a reservoir.

11. The kitty water loo of claim 10, wherein said main housing is free-standing and portable, and comprises:
    a central cavity configured to entirely contain said drawer and said reservoir therein; and
    an outer wall including an aperture configured to slidably receive said drawer along a horizontal bi-directional travel path relative to a central longitudinal axis of said main housing.

12. The kitty water loo of claim 10, wherein said main housing has an open top end configured to vertically receive said reservoir seated within said drawer, said drawer having a first friction member slidably and frictionally engaged with a second friction member of said main housing.

13. The kitty water loo of claim 12, wherein said lid has a circular shape provided with a central aperture vertically aligned along a central longitudinal axis of said main housing; wherein an outer peripheral edge of said lid is supported about said open top end of said main housing.

14. The kitty water loo of claim 10, wherein said litter trays comprise: a first litter tray being concentrically seated directly on said lid and having a first central opening vertically aligned above said reservoir.

15. The kitty water loo of claim 14, wherein said litter trays further comprise: a second litter tray being concentrically seated directly on said first litter tray and having a second central opening vertically aligned above said reservoir.

16. The kitty water loo of claim 15, wherein said litter trays further comprise: a third litter tray being concentrically seated directly on said second litter tray and having a third central opening vertically aligned above said reservoir.

17. The kitty water loo of claim 16, wherein said litter trays further comprise: a fourth litter tray being concentrically seated directly on said third litter tray and having a fourth central opening vertically aligned above said reservoir.

18. The kitty water loo of claim 17, wherein said litter trays further comprise: a fifth litter tray being concentrically seated directly said fourth litter tray and having a solid bottom surface vertically aligned above said reservoir.

\* \* \* \* \*